(12) United States Patent
Son et al.

(10) Patent No.: US 7,813,072 B2
(45) Date of Patent: Oct. 12, 2010

(54) METHOD AND APPARATUS FOR IMPROVING PERFORMANCE OF HARD DISK DRIVE AT LOW TEMPERATURE

(75) Inventors: Young Son, Yongin-si (KR); No-yeol Park, Seoul (KR); Min-pyo Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/305,241

(22) Filed: Dec. 19, 2005

(65) Prior Publication Data
US 2006/0164746 A1   Jul. 27, 2006

(30) Foreign Application Priority Data
Jan. 21, 2005   (KR) .................... 10-2005-0005815

(51) Int. Cl.
*G11B 15/18* (2006.01)
(52) U.S. Cl. .................... 360/69; 360/46; 360/67; 360/97.02
(58) Field of Classification Search .................. None
See application file for complete search history.

(56) References Cited

U.S. PATENT DOCUMENTS

| | | | |
|---|---|---|---|
| 6,078,158 A * | 6/2000 | Heeren et al. ............... 318/430 |
| 6,400,522 B1 * | 6/2002 | Milligan ...................... 360/69 |
| 6,515,817 B1 * | 2/2003 | Hamaguchi et al. ...... 360/73.03 |
| 6,735,035 B1 * | 5/2004 | Smith et al. ................... 360/69 |
| 7,035,031 B2 * | 4/2006 | Kim et al. ...................... 360/69 |
| 2004/0042105 A1 * | 3/2004 | Cho ............................. 360/31 |

FOREIGN PATENT DOCUMENTS

| | | |
|---|---|---|
| CN | 1354479 A | 6/2002 |
| JP | 2001-057010 A | 2/2001 |
| JP | 2001057010 A * | 2/2001 |
| JP | 2002-324391 A | 11/2002 |
| JP | 2002-329363 A | 11/2002 |
| JP | 2005-004819 A | 1/2005 |
| JP | 2005-032292 A | 2/2005 |
| JP | 2006-018967 A | 1/2006 |

OTHER PUBLICATIONS

Chinese Office Action dated Jun. 29, 2007 issued in Chinese Application No. 200510123717.6.

* cited by examiner

*Primary Examiner*—Jason C Olson
(74) *Attorney, Agent, or Firm*—Sughrue Mion, PLLC (57) ABSTRACT

A method and an apparatus for improving performance of a hard disk drive at low temperature are provided. The method includes: measuring an internal temperature of the hard disk drive; checking whether a measured internal temperature is not more than a predetermined critical temperature; if the measured internal temperature is not more than the predetermined critical temperature, driving a motor of the hard disk drive for a predetermined time and proceeding to the operation of the measuring of the internal temperature of the hard disk drive; and if the measured internal temperature is greater than the predetermined critical temperature, determining that reading/writing operations with respect to the hard disk drive are available.

16 Claims, 4 Drawing Sheets

FIG. 6

METHOD AND APPARATUS FOR IMPROVING PERFORMANCE OF HARD DISK DRIVE AT LOW TEMPERATURE

CROSS-REFERENCE TO RELATED PATENT APPLICATIONS

This application claims the benefit of Korean Patent Application No. 10-2005-0005815, filed on 21 Jan. 2005, in the Korean Intellectual Property Office, the disclosure of which is incorporated herein in its entirety by reference.

BACKGROUND OF THE INVENTION

1. Field of the Invention

The present invention relates to a hard disk drive, and more particularly, to a method and apparatus for improving performance of a hard disk drive at low temperature to make the hard disk drive smoothly drive at low temperature.

2. Description of the Related Art

Hard disks are aluminum or plastic thin discs on which magnetic material is coated while hard disk drives are mechanical devices for controlling reading and writing data with respect to the hard disk. The hard disk is a magnetic recording medium rotating at a high speed and exhibits a large capacity and a fast transfer speed.

The hard disk drive has a problem in that recording performance is deteriorated at low temperature. That is, the hard disk corresponding to a magnetic recording medium exhibits a deteriorated performance in reading and writing operations at low temperature. Recently, the number of cases in which the hard disk drive is applied to mobile devices, for example, mobile phones or PDAs, has been increasing. However, when the mobile devices are used in a cold area or exposed to a low temperature environment, a problem occurs in which the mobile device is not operated quickly due to a low temperature characteristic of the hard disk.

SUMMARY OF THE INVENTION

To solve the above and/or other problems, the present invention provides a method for improving performance of a hard disk drive at low temperature by which heating is performed by using internal constituent elements of the hard disk drive only without using an additional heater.

The present invention provides an apparatus for improving performance of a hard disk drive at low temperature which can perform heating using internal constituent elements of the hard disk drive only without using an additional heater.

According to an aspect of the present invention, there is provided a method for improving performance of a hard disk drive at low temperature, the method including: measuring an internal temperature of the hard disk drive; checking whether a measured internal temperature is not more than a predetermined critical temperature; if the measured internal temperature is not more than the predetermined critical temperature, driving a motor of the hard disk drive for a predetermined time and proceeding to the operation of the measuring of the internal temperature of the hard disk drive; and if the measured internal temperature is greater than the predetermined critical temperature, determining that reading/writing operations with respect to the hard disk drive are available.

According to another aspect of the present invention, there is provided a method for improving performance of a hard disk drive at low temperature, the method including: measuring an internal temperature of the hard disk drive; checking whether a measured internal temperature is not more than a predetermined critical temperature; if the measured internal temperature is not more than the predetermined critical temperature, driving a pre-amplifier of the hard disk drive for a predetermined time and proceeding to the operation of the measuring of the internal temperature of the hard disk drive; and if the measured internal temperature is greater than the predetermined critical temperature, determining that reading/writing operations with respect to the hard disk drive are available.

According to another aspect of the present invention, there is provided a method for improving performance of a hard disk drive at low temperature, the method including: measuring an internal temperature of the hard disk drive; checking whether a measured internal temperature is not more than a predetermined critical temperature; if the measured internal temperature is not more than the predetermined critical temperature, driving a motor and a pre-amplifier of the hard disk drive for a predetermined time and proceeding to the operation of the measuring of the internal temperature of the hard disk drive; and if the measured internal temperature is greater than the predetermined critical temperature, determining that reading/writing operations with respect to the hard disk drive are available.

According to another aspect of the present invention, there is provided an apparatus for improving performance of a hard disk drive at low temperature, the apparatus including: a temperature measurement portion measuring an internal temperature of the hard disk drive; a temperature comparison portion checking whether a measured internal temperature is not more than a predetermined critical temperature; a motor driving portion driving a motor of the hard disk drive for a predetermined time, in response to a result of the checking of the temperature comparison portion; and an operation availability determination portion determining that reading/writing operations with respect to the hard disk drive are available, in response to the result of the checking of the temperature comparison portion.

According to another aspect of the present invention, there is provided an apparatus for improving performance of a hard disk drive at low temperature, the apparatus including: a temperature measurement portion measuring an internal temperature of the hard disk drive; a temperature comparison portion checking whether a measured internal temperature is not more than a predetermined critical temperature; a pre-amplifier driving portion driving a pre-amplifier of the hard disk drive for a predetermined time, in response to a result of the checking of the temperature comparison portion; and an operation availability determination portion determining that reading/writing operations with respect to the hard disk drive are available, in response to the result of the checking of the temperature comparison portion.

According to another aspect of the present invention, there is provided an apparatus for improving performance of a hard disk drive at low temperature, the apparatus including: a temperature measurement portion measuring an inner temperature of the hard disk drive; a temperature comparison portion checking whether a measured internal temperature is not more than a predetermined critical temperature; a motor driving portion driving a motor of the hard disk drive for a predetermined time, in response to a result of the checking of the temperature comparison portion; a pre-amplifier driving portion driving a pre-amplifier of the hard disk drive for a predetermined time, in response to the result of the checking of the temperature comparison portion; and an operation availability determination portion determining that reading/writing operations with respect to the hard disk drive are available, in response to the result of the checking of the temperature comparison portion.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1:
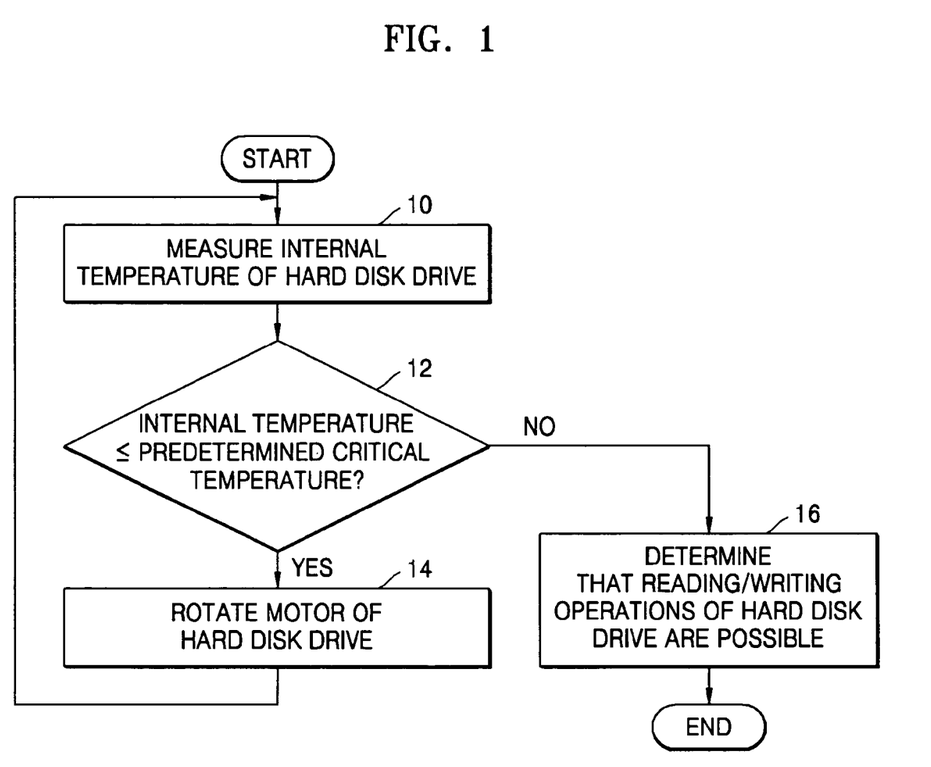
FIG. 1 is a flow chart for explaining a method for improving performance of a hard disk drive at low temperature according to an embodiment of the present invention.

FIG. 1 is a flow chart for explaining a method for improving performance of a hard disk drive at low temperature according to an embodiment of the present invention. Referring to FIG. 1, an internal temperature of the hard disk drive is measured (Step 10). The internal temperature of the hard disk drive is measured by using a temperature sensor or a temperature measurement device.

After Step 10, whether the measured internal temperature is not more than a predetermined critical temperature is checked (Step 12). The lowest temperature at which the hard disk drive can normally operate is set as the predetermined critical temperature. Hard disk drives included in mobile devices, for example, mobile phones, personal digital assistants (PDAs), MP3 (MPEG layer 3) players, computers, or notebooks, may be used in a low temperature environment. Thus, the temperature below zero corresponding to the low temperature environment is set as the predetermined critical temperature. The measured internal temperature of the hard disk drive and the predetermined critical temperature that is previously set are compared with each other and then whether the measured internal temperature is not more than the predetermined critical temperature is checked.

If the measured internal temperature is not more than the predetermined critical temperature, a motor (not shown) of the hard disk drive is rotated for a predetermined time (Step 14) and then Step 10 is performed. When the measured internal temperature is not more than the predetermined critical temperature, the hard disk drive is not placed in an environment in which the hard disk drive can normally operate. In this case, in order to make the hard disk drive normally operate, the internal temperature of the hard disk drive needs to be increased. To increase the internal temperature of the hard disk drive, the motor included in the hard disk drive is rotated. When the motor of the hard disk drive rotates, power is consumed and fluid is moved so that heat is generated and transferred in the hard disk drive. Accordingly, the internal temperature of the hard disk drive is increased. The predetermined time signifies driving time of the motor during which the internal temperature is expected to be increased sufficiently such that the hard disk drive normally operates.

It is a characteristic feature of the present invention that the motor is rotated when an actuator of the hard disk drive is positioned at a parking position. That is, according to the present invention, since the motor is rotated not for reading/writing operations which are regular operations of the hard disk drive but to increase the internal temperature of the hard disk drive, the actuator does not need to be positioned at the position for the reading/writing operations. Thus, the motor is rotated in a state in which the actuator is positioned at the parking position.

When the measured internal temperature is greater than the predetermined critical temperature in Step 12, it is determined that the reading/writing operations of the hard disk drive are available (Step 16). If the measured internal temperature is greater than the predetermined critical temperature, it is determined that the internal temperature of the hard disk drive is maintained at which the hard disk drive normally operates. Thus, it is determined that the reading/writing operations corresponding to the regular operation of the hard disk drive are available. When such a decision is made, the hard disk drive performs the regular operation.

In the method for improving performance of a hard disk drive at low temperature according to the present invention, it is a characteristic feature that the hard disk drive operates when power of an electronic device including the hard disk drive is turned on or a predetermined function of the electronic device begins. That is, Steps 10 through 16 are performed when the power of the electronic device such as mobile devices, MP3 players, computers, or notebooks which include the hard disk drive is turned on or a network connection command or an audio file play command corresponding to the predetermined function of the electronic device is given.

Figure 2:
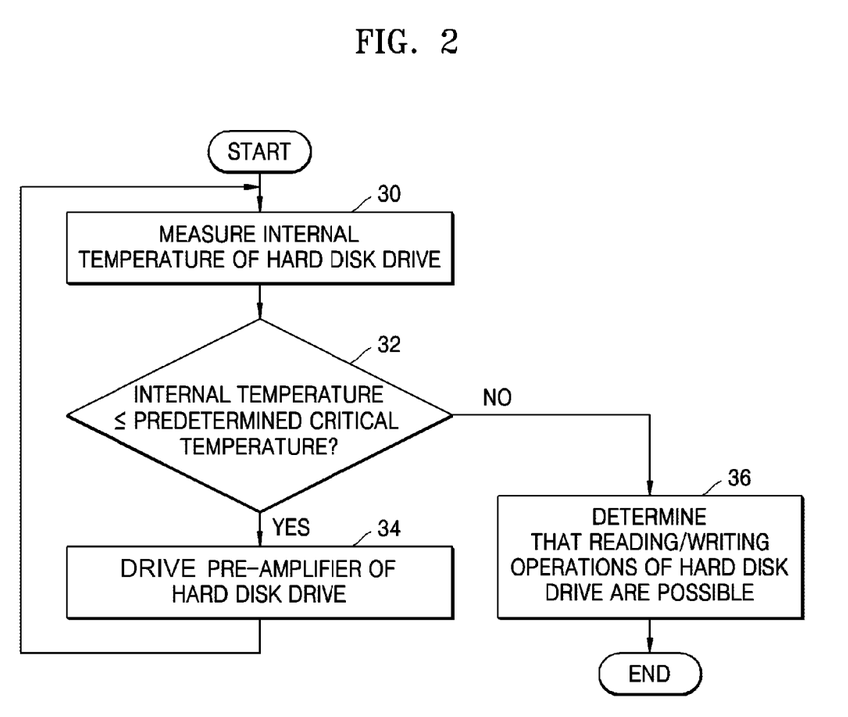
FIG. 2 is a flow chart for explaining a method for improving performance of a hard disk drive at low temperature according to another embodiment of the present invention.

FIG. 2 is a flow chart for explaining a method for improving performance of a hard disk drive at low temperature according to another embodiment of the present invention. Referring to FIG. 2, the internal temperature of the hard disk drive is measured (Step 30). The internal temperature of the hard disk drive is measured by using a temperature sensor or a temperature measurement device as in Step 10 of FIG. 1.

After Step 30, whether the measured internal temperature is not more than a predetermined critical temperature is checked (Step 32). The lowest temperature at which the hard disk drive can normally operate is set as the predetermined critical temperature. Since Step 32 is the same as Step 12 of FIG. 1, a detailed description thereof will be omitted herein.

If the measured internal temperature is not more than the predetermined critical temperature, a pre-amplifier (not shown) of the hard disk drive is driven for a predetermined time (Step 34) and then Step 30 is performed. When the measured internal temperature is not more than the predetermined critical temperature, the hard disk drive is not placed in an environment in which the hard disk drive can normally operate. In this case, in order to make the hard disk drive normally operate, the internal temperature of the hard disk drive needs to be increased. To increase the internal temperature of the hard disk drive, the pre-amplifier included in the hard disk drive is driven.

Typically, the pre-amplifier amplifies a low signal or adjusts a received signal and transmits the same. It is a physical property of the pre-amplifier that it generates heat while performing the above functions. It is a characteristic feature of the present invention that the internal temperature of the hard disk drive is increased using the heat according to the operation of the pre-amplifier.

Heat is generated according to the operation of the pre-amplifier and the internal temperature of the hard disk drive increases by the generated heat. To drive the pre-amplifier, a write signal for driving the pre-amplifier is applied to the pre-amplifier. The write signal for driving the pre-amplifier is not a signal for the regular operation of the pre-amplifier but a dummy signal for driving the pre-amplifier. The predetermined time signifies driving time of the pre-amplifier during which the internal temperature is expected to be increased sufficiently such that the hard disk drive normally operates.

The pre-amplifier is characteristically driven when the actuator of the hard disk drive is positioned at the parking position. That is, according to the present invention, since the pre-amplifier is driven not for the reading/writing operations corresponding to the regular operation of the hard disk drive but for the increase of the internal temperature of the hard disk drive, the actuator does not need to be positioned at the position for the reading/writing operations. Thus, the pre-amplifier is driven in a state in which the actuator is positioned at the parking position.

When the measured internal temperature is greater than the predetermined critical temperature in Step 32, it is determined that the reading/writing operations of the hard disk drive are available (Step 36). If the measured internal temperature is greater than the predetermined critical temperature, it is determined that the internal temperature of the hard disk drive is maintained at which the hard disk drive normally operates. Thus, it is determined that the reading/writing operations corresponding to the regular operation of the hard disk drive are available. When such a determination is made, the hard disk drive performs the regular operation.

In the above-described method for improving performance of a hard disk drive at low temperature according to another embodiment of the present invention, it is a characteristic feature that the hard disk drive operates when power of an electronic device including the hard disk drive is turned on or a predetermined function of the electronic device begins. That is, Steps 30 through 36 are performed when the power of the electronic device such as mobile devices, MP3 players, computers, or notebooks which include the hard disk drive is turned on or a network connection command or an audio file play command corresponding to the predetermined function of the electronic device is given.

Figure 3:
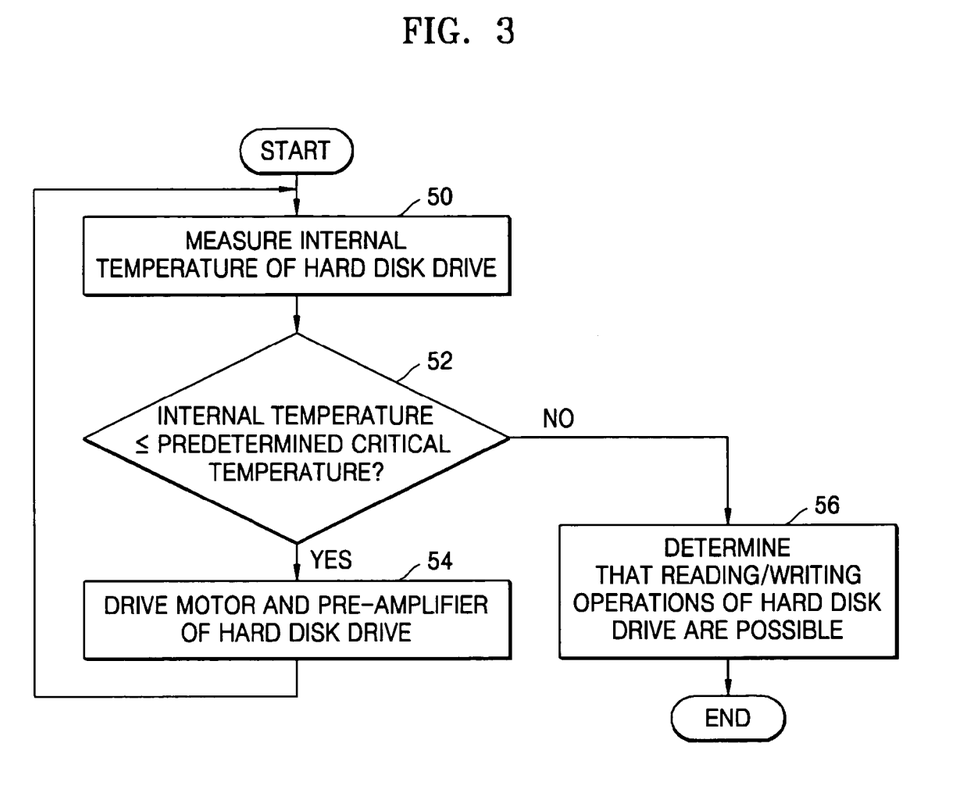
FIG. 3 is a flow chart for explaining a method for improving performance of a hard disk drive at low temperature according to yet another embodiment of the present invention.

FIG. 3 is a flow chart for explaining a method for improving performance of a hard disk drive at low temperature according to yet another embodiment of the present invention. Referring to FIG. 3, the internal temperature of the hard disk drive is measured (Step 50). The internal temperature of the hard disk drive is measured by using a temperature sensor or a temperature measurement device as in Step 10 of FIG. 1 and Step 30 of FIG. 2.

After Step 50, whether the measured internal temperature is not more than a predetermined critical temperature is checked (Step 52). The lowest temperature at which the hard disk drive can normally operate is set as the predetermined critical temperature. Since Step 52 is the same as Step 12 of FIG. 1 and Step 32 of FIG. 3, a detailed description thereof will be omitted herein.

If the measured internal temperature is not more than the predetermined critical temperature, the motor and pre-amplifier of the hard disk drive are driven for a predetermined time (Step 54) and then Step 50 is performed. When the measured internal temperature is not more than the predetermined critical temperature, the hard disk drive is not placed in an environment in which the hard disk drive can normally operate. In this case, in order to make the hard disk drive normally operate, the internal temperature of the hard disk drive needs to be increased. To increase the internal temperature of the hard disk drive, the motor and pre-amplifier included in the hard disk drive are driven.

Heat is generated according to the operation of the motor and pre-amplifier and the internal temperature of the hard disk drive increases by the generated heat. To drive the pre-amplifier, a write signal for driving the pre-amplifier is applied to the pre-amplifier. The write signal for driving the pre-amplifier is not a signal for the original operation of the pre-amplifier but a dummy signal for driving the pre-amplifier. The predetermined time signifies driving time of the motor and pre-amplifier during which the internal temperature is expected to be increased sufficiently such that the hard disk drive normally operates.

The motor and pre-amplifier are characteristically driven when the actuator of the hard disk drive is positioned at the parking position. That is, according to the present invention, since the motor and pre-amplifier are driven not for the reading/writing operations corresponding to the regular operation of the hard disk drive but to increase the internal temperature of the hard disk drive, the actuator does not need to be positioned at the position for the reading/writing operations. Thus, the motor and pre-amplifier are driven in a state in which the actuator is positioned at the parking position.

When the measured internal temperature is greater than the predetermined critical temperature in Step 52, it is determined that the reading/writing operations of the hard disk drive are available (Step 56). If the measured internal temperature is greater than the predetermined critical temperature, it is determined that the internal temperature of the hard disk drive is maintained at which the hard disk drive normally operates. Thus, it is determined that the reading/writing operations corresponding to the regular operation of the hard disk drive are available. When such a determination is made, the hard disk drive performs the regular operation.

In the above-described method for improving performance of a hard disk drive at low temperature according to another embodiment of the present invention, it is a characteristic feature that the hard disk drive operates when power of an electronic device including the hard disk drive is turned on or a predetermined function of the electronic device begins. That is, Steps 50 through 56 are performed when the power of the electronic device such as mobile devices, MP3 players, computers, or notebooks which include the hard disk drive is turned on or a network connection command or an audio file play command corresponding to the predetermined function of the electronic device is given.

Figure 4:
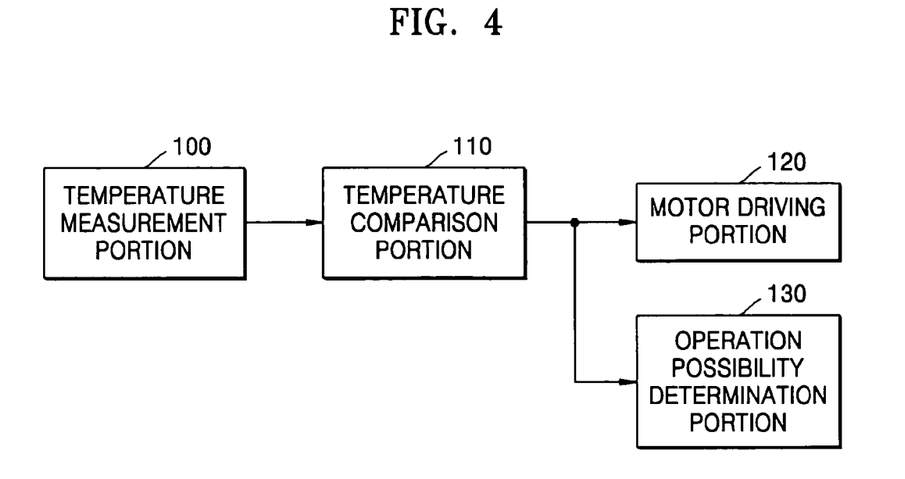
FIG. 4 is a block diagram of an apparatus for improving performance of a hard disk drive at low temperature according to an embodiment of the present invention.

FIG. 4 is a block diagram of an apparatus for improving performance of a hard disk drive at low temperature according to an embodiment of the present invention. Referring to FIG. 4, an apparatus according to an embodiment of the present invention includes a temperature measurement portion 100, a temperature comparison portion 110, a motor driving portion 120, and an operation possibility determination portion 130.

The temperature measurement portion 100 measures the internal temperature of the hard disk drive and outputs a result of the measurement to the temperature comparison portion 110. The temperature measurement portion 100 includes a temperature sensor or measurement apparatus for measuring the internal temperature of the hard disk drive.

The temperature comparison portion 110 checks whether the measured internal temperature received from the temperature measurement portion 100 is not more than a predetermined critical temperature by comparing the measured internal temperature and the predetermined critical temperature and outputs a result of the comparison to the motor driving portion 120 and the operation availability determination portion 130. The lowest temperature at which the hard disk drive can normally operate is set as the predetermined critical temperature.

The motor driving portion 120, in response to the result of the comparison of the temperature comparison portion 110, drives a motor (not shown) of the hard disk drive for a predetermined time. When receiving from the temperature comparison portion 110 a comparison result that the measured internal temperature is not more than the predetermined critical temperature, the motor driving portion 120 rotates the motor included in the hard disk drive to raise the internal temperature of the hard disk drive. As the motor rotates, power consumption and fluid movement occur in the hard disk drive so that the internal temperature of the hard disk drive increases according to the generated heat.

The motor driving portion 120 drives the motor for a predetermined time during which the internal temperature of the hard disk drive is expected to be increased such that the hard disk drive can normally operate. The motor driving portion 120 characteristically drives the motor when the actuator of the hard disk drive is positioned at the parking position.

The operation possibility determination portion 130, in response to the comparison result of the temperature comparison portion 110, determines that the reading/writing operations with respect to the hard disk drive are available. When receiving from the temperature comparison portion 110 a comparison result that the measured internal temperature is greater than the predetermined critical temperature, the operation availability determination portion 130 determines that the reading/writing operations corresponding to the original operation are available. When such a decision is made, the hard disk drive is ready to perform the original operation.

In the apparatus for improving performance of a hard disk drive at low temperature according to an embodiment of the present invention, it is a characteristic feature that the hard disk drive operates when power of an electronic device including the hard disk drive is turned on or a predetermined function of the electronic device begins. That is, the operations of the temperature measurement portion 100, the temperature comparison portion 110, the motor driving portion 120, and the operation possibility determination portion 130 are performed when the power of the electronic device such as mobile devices, MP3 players, computers, or notebooks which include the hard disk drive is turned on or a network connection command or an audio file play command corresponding to the predetermined function of the electronic device is given.

Figure 5:
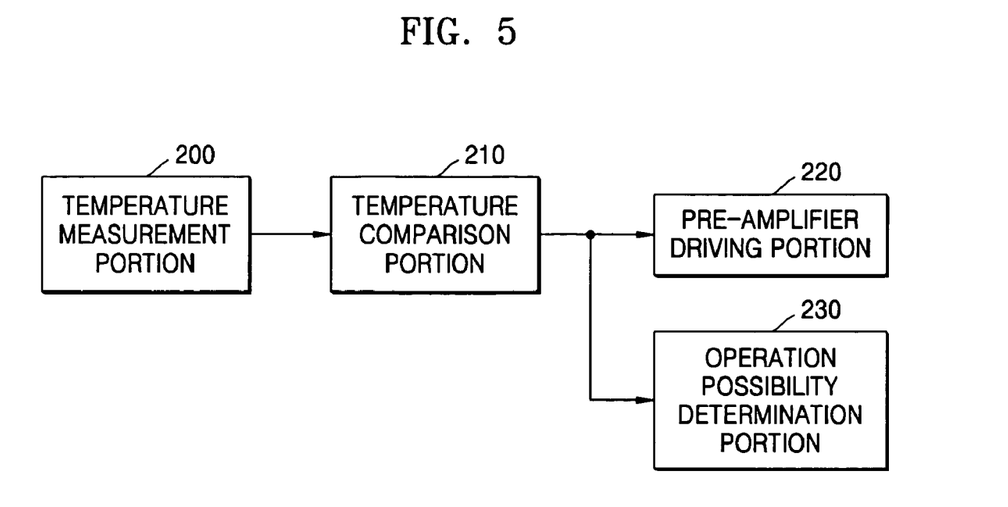
FIG. 5 is a block diagram of an apparatus for improving performance of a hard disk drive at low temperature according to another embodiment of the present invention.

FIG. 5 is a block diagram of an apparatus for improving performance of a hard disk drive at low temperature according to another embodiment of the present invention. Referring to FIG. 5, an apparatus according to another embodiment of the present invention includes a temperature measurement portion 200, a temperature comparison portion 210, a pre-amplifier driving portion 220, and an operation possibility determination portion 230.

The temperature measurement portion 200 measures the internal temperature of the hard disk drive and outputs a result of the measurement to the temperature comparison portion 210. The temperature measurement portion 200 includes a temperature sensor or measurement apparatus for measuring the internal temperature of the hard disk drive.

The temperature comparison portion 210 checks whether the measured internal temperature received from the temperature measurement portion 200 is not more than a predetermined critical temperature by comparing the measured internal temperature and the predetermined critical temperature and outputs a result of the comparison to the pre-amplifier driving portion 220 and the operation availability determination portion 230. The lowest temperature at which the hard disk drive can normally operate is set as the predetermined critical temperature.

The pre-amplifier driving portion 220, in response to the result of the comparison of the temperature comparison portion 210, drives a pre-amplifier (not shown) of the hard disk drive for a predetermined time. The pre-amplifier amplifies a low signal or adjusts a received signal and transmits the same. It is a physical property of the pre-amplifier that it generates heat while performing the above functions. It is a characteristic feature of the present invention that the internal temperature of the hard disk drive is increased using the heat according to the operation of the pre-amplifier.

To drive the pre-amplifier, the pre-amplifier driving portion 220 applies a write signal for driving the pre-amplifier to the pre-amplifier. The write signal for driving the pre-amplifier is not a signal for the original operation of the pre-amplifier but a dummy signal for driving the pre-amplifier.

When receiving from the temperature comparison portion 210 a comparison result that the measured internal temperature is not more than the predetermined critical temperature, the pre-amplifier driving portion 220 drives the pre-amplifier included in the hard disk drive to raise the internal temperature of the hard disk drive. As the pre-amplifier is driven, heat is generated in the hard disk drive so that the internal temperature of the hard disk drive increases according to the generated heat.

The pre-amplifier driving portion 220 drives the pre-amplifier for a predetermined time during which the internal temperature of the hard disk drive is expected to be increased such that the hard disk drive can normally operate. The pre-amplifier driving portion 220 characteristically drives the pre-amplifier when the actuator of the hard disk drive is positioned at the parking position.

The operation possibility determination portion 230, in response to the comparison result of the temperature comparison portion 210, determines that the reading/writing operations with respect to the hard disk drive are available. When receiving from the temperature comparison portion 210 a comparison result that the measured internal temperature is greater than the predetermined critical temperature, the operation possibility determination portion 230 determines that the reading/writing operations corresponding to the original operation are available. When such a decision is made, the hard disk drive is ready to perform the original operation.

In the apparatus for improving performance of a hard disk drive at low temperature according to an embodiment of the present invention, it is a characteristic feature that the hard disk drive operates when power of an electronic device including the hard disk drive is turned on or a predetermined function of the electronic device begins. That is, the operations of the temperature measurement portion 200, the temperature comparison portion 210, the pre-amplifier driving portion 220, and the operation possibility determination portion 230 are performed when the power of the electronic device such as mobile devices, MP3 players, computers, or notebooks which include the hard disk drive is turned on or a network connection command or an audio file play command corresponding to the predetermined function of the electronic device is given.

Figure 6:
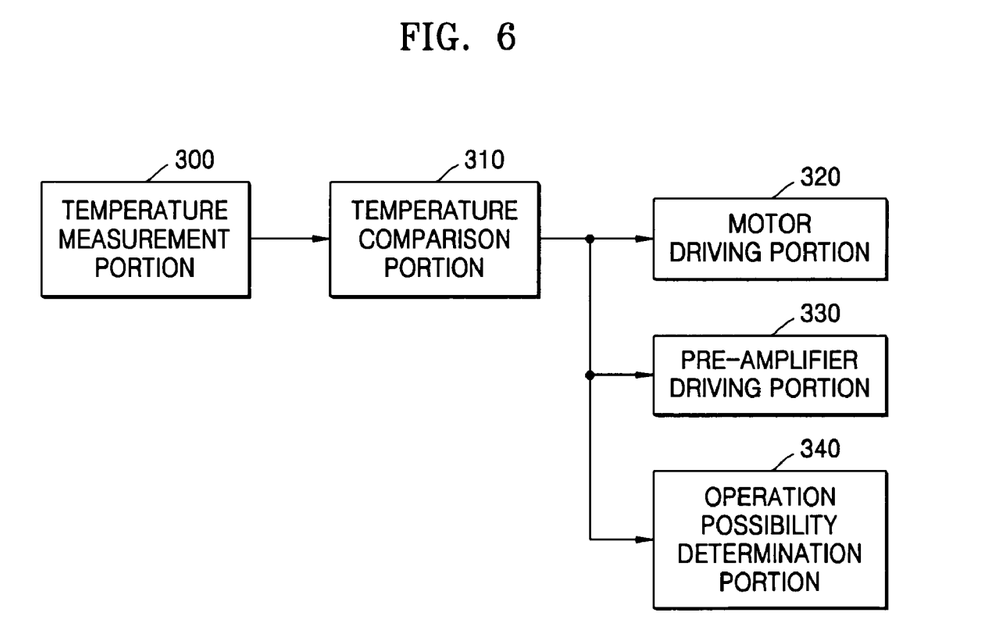
FIG. 6 is a block diagram of an apparatus for improving performance of a hard disk drive at low temperature according to yet another embodiment of the present invention.

FIG. 6 is a block diagram of an apparatus for improving performance of a hard disk drive at low temperature according to yet another embodiment of the present invention. Referring to FIG. 6, an apparatus according to yet another embodiment of the present invention includes a temperature measurement portion 300, a temperature comparison portion 310, a motor driving portion 320, a pre-amplifier driving portion 330, and an operation possibility determination portion 340.

The temperature measurement portion 300 measures the internal temperature of the hard disk drive and outputs a result of the measurement to the temperature comparison portion 310. The temperature measurement portion 300 includes a temperature sensor or measurement apparatus for measuring the internal temperature of the hard disk drive.

The temperature comparison portion 310 checks whether the measured internal temperature received from the temperature measurement portion 300 is not more than a predetermined critical temperature by comparing the measured internal temperature and the predetermined critical temperature and outputs a result of the comparison to the motor driving portion 320, the pre-amplifier driving portion 330 and the operation possibility determination portion 340. The lowest temperature at which the hard disk drive can normally operate is set as the predetermined critical temperature.

The motor driving portion 320, in response to the result of the comparison of the temperature comparison portion 310, drives the motor of the hard disk drive for a predetermined time. When receiving from the temperature comparison portion 310 a comparison result that the measured internal temperature is not more than the predetermined critical temperature, the motor driving portion 320 rotates the motor included in the hard disk drive to raise the internal temperature of the hard disk drive. As the motor rotates, power consumption and fluid movement occur in the hard disk drive so that the internal temperature of the hard disk drive increases according to the generated heat.

The motor driving portion 320 drives the motor for a predetermined time during which the internal temperature of the hard disk drive is expected to be increased such that the hard disk drive can normally operate. The motor driving portion 320 characteristically drives the motor when the actuator of the hard disk drive is positioned at the parking position.

The pre-amplifier driving portion 330, in response to the result of the comparison of the temperature comparison portion 310, drives the pre-amplifier of the hard disk drive for a predetermined time. To drive the pre-amplifier, the pre-amplifier driving portion 330 applies a write signal for driving the pre-amplifier to the pre-amplifier.

When receiving from the temperature comparison portion 310 a comparison result that the measured internal temperature is not more than the predetermined critical temperature, the pre-amplifier driving portion 330 drives the pre-amplifier included in the hard disk drive to raise the internal temperature of the hard disk drive. As the pre-amplifier is driven, heat is generated in the hard disk drive so that the internal temperature of the hard disk drive increases according to the generated heat.

The pre-amplifier driving portion 330 drives the pre-amplifier for a predetermined time during which the internal temperature of the hard disk drive is expected to be increased such that the hard disk drive can normally operate. The pre-amplifier driving portion 330 characteristically drives the pre-amplifier when the actuator of the hard disk drive is positioned at the parking position.

The operation possibility determination portion 340, in response to the comparison result of the temperature comparison portion 310, determines that the reading/writing operations with respect to the hard disk drive are available. When receiving from the temperature comparison portion 310 a comparison result that the measured internal temperature is greater than the predetermined critical temperature, the operation possibility determination portion 340 determines that the reading/writing operations corresponding to the original operation are available. When such a decision is made, the hard disk drive is ready to perform the original operation.

In the apparatus for improving performance of a hard disk drive at low temperature according to an embodiment of the present invention, it is a characteristic feature that the hard disk drive operates when power of an electronic device including the hard disk drive is turned on or a predetermined function of the electronic device begins. That is, the operations of the temperature measurement portion 300, the temperature comparison portion 310, the motor driving portion 320, the pre-amplifier driving portion 330, and the operation availability determination portion 340 are performed when the power of the electronic device such as mobile devices, MP3 players, computers, or notebooks which include the hard disk drive is turned on or a network connection command or an audio file play command corresponding to the predetermined function of the electronic device is given.

While this invention has been particularly shown and described with reference to preferred embodiments thereof, it will be understood by those skilled in the art that various changes in form and details may be made therein without departing from the spirit and scope of the invention as defined by the appended claims. For example, although it has been described that an embodiment of the invention drives a pre-amplifier, it will be understood that any component of the disk drive that generates heat while driven can be used to heat the disk drive. As another example, although exemplary embodiments have been described using a hard disk drive, it will be appreciated that any rotating or moving storage apparatus may be used.

As described above, according to the method and apparatus for improving performance of a hard disk drive at low temperature according to the present invention, without installing an additional heater, the internal temperature of the hard disk drive is increased using the internal constituent elements only.

Also, the reading/writing operations with respect to the hard disk drive can be quickly performed in a low temperature environment. In addition, the hard disk drive used in mobile devices used in a low temperature environment can be quickly driven.

What is claimed is:

1. A method for improving performance of a disk drive at low temperature, the method comprising:
   measuring an internal temperature of the disk drive;
   comparing the measured internal temperature with a predetermined temperature; and
   if the measured internal temperature is not greater than the predetermined temperature, driving a pre-amplifier of the disk drive using a write signal until the measured internal temperature is greater than the predetermined temperature,
   wherein, in the driving a pre-amplifier of the disk drive, the pre-amplifier is driven when an actuator of the disk drive is positioned at a parking position; and wherein heat generated by the pre-amplifier during the driving the pre-amplifier is the primary source of heat for increasing the internal temperature of the disk drive.

2. The method as claimed in claim 1, further comprising if the measured internal temperature is greater than the predetermined temperature, determining that reading/writing operations with respect to the disk drive are available.

3. The method as claimed in claim 1, being performed when power of an electronic device including the disk drive is turned on or a predetermined function of the electronic device begins.

4. The method as claimed in claim 1, wherein the disk drive is a hard disk drive.

5. A method for improving performance of a disk drive at low temperature, the method comprising:
   measuring an internal temperature of the disk drive;
   comparing the measured internal temperature with a predetermined temperature; and
   if the measured internal temperature is not greater than the predetermined temperature, driving a motor and a pre-amplifier of the disk drive until the measured internal temperature is greater than the predetermined temperature;
   wherein the pre-amplifier of the disk drive is driven using a write signal,
   wherein, in the driving a motor and pre-amplifier of the disk drive, the motor and the pre-amplifier are driven when an actuator of the disk drive is positioned at a parking position; and
   wherein heat generated by the pre-amplifier during the driving the pre-amplifier is the primary source of heat for increasing the internal temperature of the disk drive.

6. The method as claimed in claim 5, further comprising if the measured internal temperature is greater than the predetermined temperature, determining that reading/writing operations with respect to the disk drive are available.

7. The method as claimed in claim 5, being performed when power of an electronic device including the disk drive is turned on or a predetermined function of the electronic device begins.

8. The method as claimed in claim 5, wherein the disk drive is a hard disk drive.

9. An apparatus for improving performance of a disk drive at low temperature, the apparatus comprising:
   a temperature measurement portion measuring an internal temperature of the disk drive;
   a temperature comparison portion checking whether a measured internal temperature is not more than a predetermined temperature; and
   a pre-amplifier driving portion driving a pre-amplifier of the disk drive using a write signal until the temperature comparison portion indicates that the measured internal temperature is greater than the predetermined temperature,
   wherein the pre-amplifier driving portion drives the pre-amplifier when an actuator of the disk drive is positioned at a parking position; and
   wherein heat generated by the pre-amplifier when the pre-amplifier is driven is the primary source of heat for increasing the internal temperature of the disk drive.

10. The apparatus of claim 9, further comprising:
    an operation availability determination portion determining that reading/writing operations with respect to the disk drive are available, in response to the result of the checking of the temperature comparison portion.

11. The apparatus as claimed in claim 9, being operated when power of an electronic device including the disk drive is turned on or a predetermined function of the electronic device begins.

12. The apparatus as claimed in claim 9, wherein the disk drive is a hard disk drive.

13. An apparatus for improving performance of a disk drive at low temperature, the apparatus comprising:
    a temperature measurement portion measuring an inner temperature of the disk drive;
    a temperature comparison portion checking whether a measured internal temperature is not more than a predetermined temperature;
    a motor driving portion driving a motor of the disk drive until the temperature comparison portion indicates that the measured internal temperature is greater than the predetermined temperature; and
    a pre-amplifier driving portion driving a pre-amplifier of the disk drive using a write signal until the temperature comparison portion indicates that the measured internal temperature is greater than the predetermined temperature,
    wherein the motor driving portion drives the motor when an actuator of the disk drive is positioned at a parking position; and
    wherein heat generated by the pre-amplifier when the pre-amplifier is driven is the primary source of heat for increasing the internal temperature of the disk drive.

14. The apparatus of claim 13, further comprising:
    an operation availability determination portion determining that reading/writing operations with respect to the disk drive are available, in response to the result of the checking of the temperature comparison portion.

15. The apparatus as claimed in claim 13, wherein the pre-amplifier driving portion drives the pre-amplifier when an actuator of the disk drive is positioned at a parking position.

16. The apparatus as claimed in claim 13, being operated when power of an electronic device including the disk drive is turned on or a predetermined function of the electronic device begins.

* * * * *